(No Model.)
C. J. SHIRREFF.
Velocipede.
No. 243,166. Patented June 21, 1881.
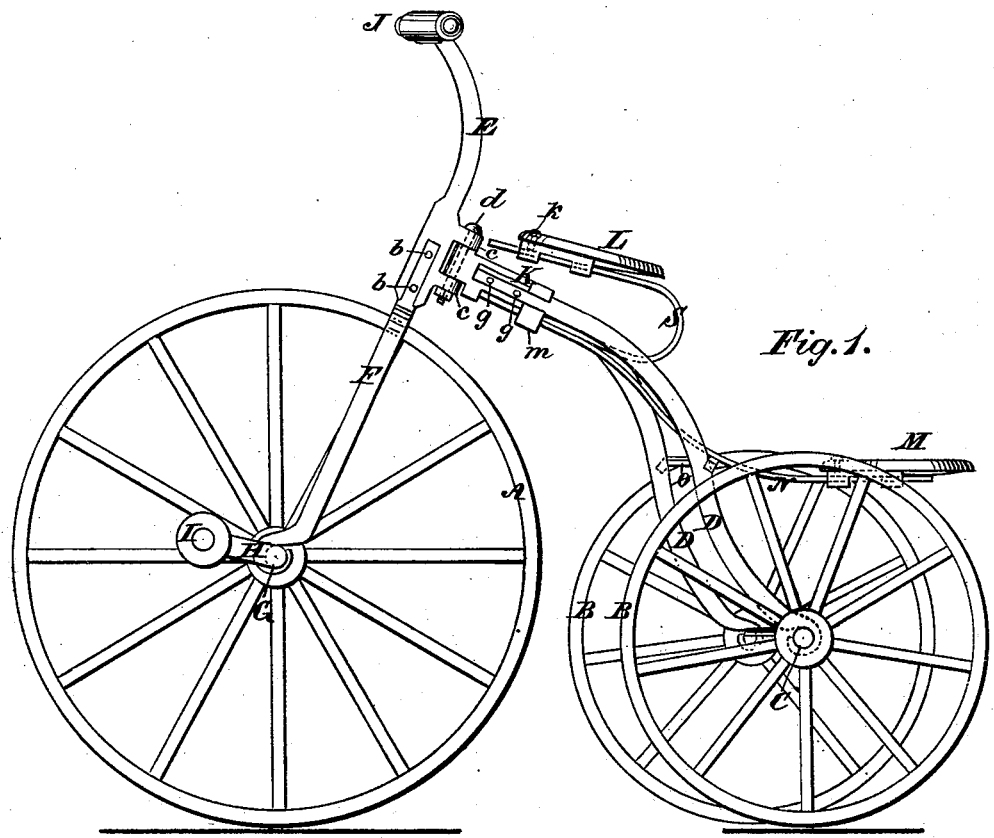
Witnesses:
John Grist,
Fred J. Ross.
Inventor:
C. J. Shirreff,
By Henry Grist
Att'y.

UNITED STATES PATENT OFFICE.

CHARLES J. SHIRREFF, OF BROCKVILLE, ONTARIO, CANADA.

VELOCIPEDE.

SPECIFICATION forming part of Letters Patent No. 243,166, dated June 21, 1881.

Application filed March 31, 1881. (No model.)

*To all whom it may concern:*

Be it known that I, CHARLES JAMES SHIRREFF, of Brockville, in the county of Leeds, in the Province of Ontario, Canada, have invented certain new and useful Improvements on Velocipedes; and I do hereby declare that the following is a full, clear, and exact description of the same.

This invention relates to improvements on velocipedes, the object of the invention being to provide an adjustable spring-seat for the driver and an attachable seat for a passenger, and in conjoining the structural parts, whereby cheapness of manufacture is obtained.

Figure 1 is an elevation of my improved velocipede. Fig. 2 is a detail side view of the steering-arm detached. Fig. 3 is a rear view. Fig. 4 is a plan of the bifurcated reach. Fig. 5 is a section on line $x\ x$, Fig. 2. Fig. 6 is a detail side view of the joint coupling the reach to the steering-bar. Fig. 7 is a section of the same. Figs. 8 and 9 are bottom and sectional views of the driver's seat.

In the manufacture of velocipedes the frame-work has usually been made of wrought-iron or cast-iron made malleable. The former is expensive by reason of the labor expended, and the latter is costly, owing to its occupying great bulk in the annealing-retort. I propose to construct the frame, which shall be composed of rolled and malleable iron, the former of oval iron, and the latter made with a cavity to socket therein and be fastened by rivets.

A is the front steering-wheel, and B two wheels on the ends of rear axle, C, connected by a bifurcated reach, D, with the steering-arm E, which connects with the crank-axle G of steering-wheel by bifurcated arms F, and which constitutes the ordinary frame of a velocipede. The arms F are of rolled oval iron, the end flattened and bent around the axle G, between the hub of the wheel and the cranks H, which are provided with friction-rollers I, in the usual manner.

The steering-arm E is of malleable cast-iron, with oval-shaped cavities $a\ a$, into which the upper ends of arms F fit telescopically, and are secured by rivets $b$, whereby the parts are firmly conjoined. The upper end of the steering-arm is provided with a hand-bar, J, crosswise, for guiding the velocipede in its course in the usual manner. The steering-arm is cast with bored lugs $c\ c$, to connect it with the head K of the reach by a pintle, $d$, passing through a hole, $e$, in its end, whereby a hinged joint is formed in the usual manner.

The head K is cast malleable, with oval cavities $ff$, to receive semi-telescopically the reach-bars D, which are of oval rolled iron, and secured by rivets $g\ g$. The other ends of the reaches are flattened and bent around the rear axle inside of the hubs of the wheels. The under side of the head K is cast with sockets $h$, in which is secured one leg of a flat spring, S, bent to horseshoe shape, the other leg carrying a seat, L, for the driver, the seat-frame having on its under side a socket, $j$, in which the leg of the spring slides, so that the seat can be shifted near to or from the steering-arm to suit the driver. The seat is fastened in its adjusted position by a binding-screw, $k$. The circular seat-bottom is made of perforated wood veneer pressed into form and let into the frame and secured by screws or other fastening.

M is a removable seat to carry a passenger at the rear of the driver. It is constructed in manner described for the driver's seat, and is supported between the rear wheel by a bar, N, connecting with the seat, and with a socket, $m$, on the under side of the reach-head, and bearing on a bar, O, crossing the reaches, or other suitable manner.

I claim as my invention—

1. A velocipede-frame composed of cast-iron malleable steering-arm E and reach-head K, having cavities $a\ a$ and $ff$, rolled-iron arms F F, and reaches D D, conjoined to the arm and reach-head, said arm and head being connected by pintle $d$, as set forth.

2. The adjustable sliding seat L, in combination with spring S and reach-head K, as set forth.

3. The removable seat M, connected to reach-head K by bar N, and bearing on reach-bars D D, as set forth.

C. J. SHIRREFF.

Witnesses:
C. SHEPHERD,
J. A. ELLIOTT.